(12) United States Patent
Allali

(10) Patent No.: US 11,894,688 B2
(45) Date of Patent: Feb. 6, 2024

(54) ELECTRICAL CIRCUIT FOR CHARGING A DC VOLTAGE SOURCE

(71) Applicant: VALEO SYSTEMES DE CONTROLE MOTEUR, Cergy Pontoise (FR)

(72) Inventor: Nicolas Allali, Cergy Pontoise (FR)

(73) Assignee: VALEO SYSTEMES DE CONTROLE MOTEUR, Cergy Pontoise (FR)

(*) Notice: Subject to any disclaimer, the term of this patent is extended or adjusted under 35 U.S.C. 154(b) by 90 days.

(21) Appl. No.: 17/621,724

(22) PCT Filed: Jun. 11, 2020

(86) PCT No.: PCT/EP2020/066190
§ 371 (c)(1),
(2) Date: Dec. 22, 2021

(87) PCT Pub. No.: WO2020/260032
PCT Pub. Date: Dec. 30, 2020

(65) Prior Publication Data
US 2022/0247211 A1     Aug. 4, 2022

(30) Foreign Application Priority Data

Jun. 24, 2019 (FR) .................................. 19 06832

(51) Int. Cl.
*H02J 50/05* (2016.01)
*H02J 7/06* (2006.01)
(Continued)

(52) U.S. Cl.
CPC ............... *H02J 50/05* (2016.02); *H02J 7/06* (2013.01); *H02M 7/05* (2021.05); *H02M 7/1552* (2013.01)

(58) Field of Classification Search
CPC .... H02J 50/05; H02J 7/06; H02J 7/02; H02M 7/05; H02M 7/1552; H02M 5/297;
(Continued)

(56) References Cited

U.S. PATENT DOCUMENTS 8,270,188 B1 *   9/2012  Kim ........................ H02M 7/06
                                                                    307/15
2003/0116348 A1 *  6/2003  Nakatani ............... H01L 23/642
                                                                    174/257
(Continued)

FOREIGN PATENT DOCUMENTS

KR       20160027408      *  3/2016
WO       WO 2016/179329 A1    11/2016

OTHER PUBLICATIONS

International Search Report dated Aug. 24, 2020 in PCT/EP2020/066190, filed on Jun. 11, 2020, 3 pages.
(Continued)

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

An electrical circuit for charging a DC voltage source from an AC voltage network. The circuit includes an input that is able to receive an AC voltage from the voltage network, and a first output able to be connected to the DC voltage source. An insulating stage formed using a plurality of capacitors is arranged so as to electrically insulate the input from the first output of the circuit. A frequency-raising stage is arranged between the input of the circuit and the insulating stage so that the capacitors of the insulating stage are in a circuit portion that has flowing through it an AC current at a frequency that is greater than that of the AC network.

21 Claims, 3 Drawing Sheets

Figure 1:
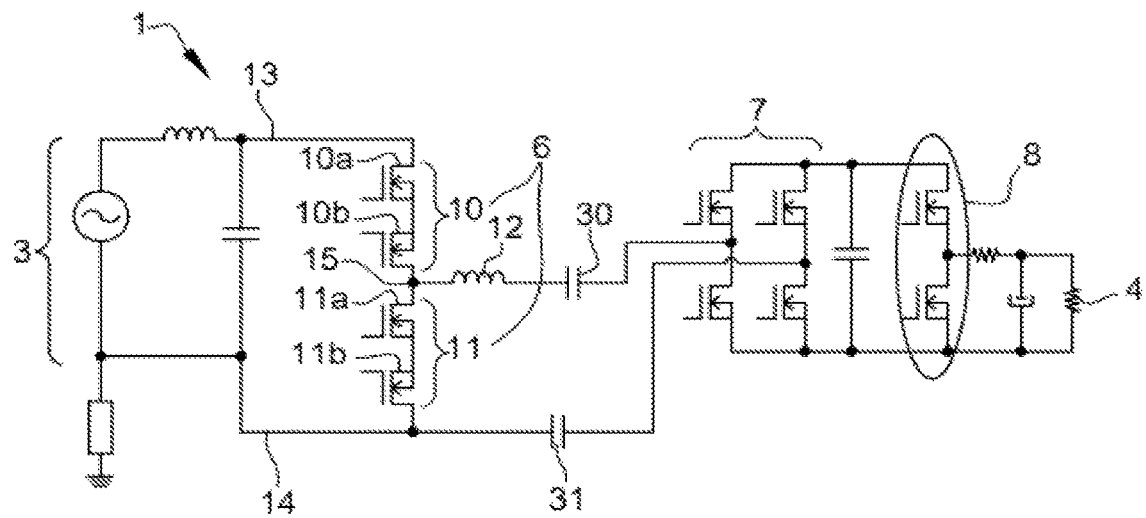

(51) Int. Cl.
*H02M 7/04* (2006.01)
*H02M 7/155* (2006.01)

(58) Field of Classification Search
CPC .... H02M 7/003; Y02T 10/70; Y02T 10/7072; Y02T 90/14
USPC ......................................................... 307/109
See application file for complete search history.

(56) References Cited

U.S. PATENT DOCUMENTS

| | | | |
|---|---|---|---|
| 2017/0338732 A1* | 11/2017 | Amirabadi | H02M 3/155 |
| 2018/0166915 A1* | 6/2018 | Afridi | H02J 50/05 |
| 2020/0287413 A1* | 9/2020 | Peretz | H02M 3/015 |
| 2021/0280920 A1* | 9/2021 | Rinaldo | G01R 31/44 |

OTHER PUBLICATIONS

Al-Saadi, et al. "Comparative Study of Compensation Circuit Topologies in 6,6k W Capacitive Power Transfer System", 2019 11$^{th}$ International Symposium on Advanced Topics in Electrical Engineering (ATEE), IEEE, Mar. 28, 2019, pp. 1-6.

Elekhtiar, et al. "Design of a Capacitive Power Transfer System for Charging of Electric Vehicles", 2018 IEEE Symposium on Computer Applications & Industrial Electronics (ISCAIE), IEEE, Apr. 28, 2018, pp. 150-155.

Kumar et al. "A High-Frequency Inverter Architecture for Providing Variable Compensation in Wireless Power Transfer Systems", 2018 IEEE Applied Power Electronics Conference and Exposition (APEC), IEEE, Mar. 4, 2018, pp. 3154-3159.

Khan et al. "High Efficiency Buck and Boost Type AC-AC Converters", 2015 17$^{th}$ European Conference on Power Electronics and Applications (EPE'15 ECC—Europe) Sep. 8, 2015, pp. 1-10.

* cited by examiner

ELECTRICAL CIRCUIT FOR CHARGING A DC VOLTAGE SOURCE

The present invention relates to an electrical circuit for charging a DC voltage source using an AC network. The invention applies in particular, but not exclusively, to charging a DC voltage source serving to supply electric power to a propulsion motor of an electric or hybrid vehicle.

For various reasons such as safety, or two voltage sources not being referenced to each other, it may be desirable for there to be electrical insulation between the AC electrical network and the DC voltage source charged by this electrical network. For this purpose, it is known practice to use a magnetic transformer. Such a transformer has the drawback of having to use a magnetic core. Employing such a magnetic core entails bulk, an increased weight and a high cost, and may prove difficult to integrate into the electrical circuit.

Patent application WO2016/179329 teaches associating an inverter connected to a DC voltage source with such a capacitive transformer.

There is a need to remedy the drawbacks associated with employing a magnetic transformer.

The aim of the invention is to meet this need and it achieves this, according to one of its aspects, using an electrical circuit for charging a DC voltage source from an AC voltage network, the circuit comprising:
- an input able to receive an AC voltage from the voltage network,
- a first output able to be connected to the DC voltage source,
- a capacitive transformer formed using a plurality of capacitors, which is arranged so as to electrically insulate the input from the first output of the circuit, and
- a frequency-raising stage arranged between the input of the circuit and the capacitive transformer so that the capacitors of the capacitive transformer are in a circuit portion that has flowing through it an AC current at a frequency that is greater than that of the AC network, the frequency-raising stage comprising a first branch comprising two controllable electronic switches arranged in series, so as to produce a first switching cell that is bidirectional in terms of current and in terms of voltage, and
- a second branch comprising two controllable electronic switches
arranged in series, so as to produce a second switching cell that is bidirectional in terms of current and in terms of voltage,
the first and the second branch of the frequency-raising stage having a common terminal forming an output of the frequency-raising stage and an input of the
capacitive transformer.

The invention makes it possible to use a capacitive transformer the capacitors of which are arranged in a circuit portion that has flowing through it an AC current at a higher frequency than that of the electrical network, such that these capacitors may be smaller in size and/or lower in cost. This capacitive transformer may also be called the "insulating stage". The one or more resonant inductors associated with these capacitors may also be small in size and/or lower in cost. In addition, with the frequency-raising stage being different from the association of a rectifier and of an inverter connected downstream of the rectifier, the invention makes it possible to produce a frequency-raising stage more simply than via the aforementioned association of a rectifier and of an inverter, thus reducing the cost of this frequency-raising stage and, in addition, improving its efficiency.

All the capacitors of the insulating stage may be mounted on one and the same circuit board, this board bearing, for example, all or some of the rest of the electrical circuit.

The input of the circuit may be connected to a single-phase or polyphase connector, making it possible to connect to the AC network, the latter being, for example, an industrial electrical network managed by an operator. This AC network may deliver a voltage that is greater than 100 V. It may be a single-phase or polyphase, for example three-phase, network.

The electrical circuit may be devoid of impedance-matching stage.

The first DC voltage source has, for example, a voltage with a value that is equal to 48 V, or a voltage with a value that is greater than 300 V.

In the case where the capacitive transformer is arranged in a single-phase portion of the circuit, the frequency-raising stage may consist of the aforementioned first and second branches.

The capacitive transformer may be arranged in a single-phase portion of the electrical circuit, the capacitive transformer then comprising a first capacitor and a second capacitor, the first capacitor being arranged on the phase and the second capacitor being arranged on the neutral.

As a variant, the capacitive transformer may be arranged in a polyphase portion of the circuit, in particular a three-phase portion of the circuit, the capacitive transformer then comprising a plurality of capacitors such that each capacitor is respectively arranged on a phase or on the neutral. The capacitive transformer may then comprise a number of capacitors that is equal to the number of phases of this portion that has AC current flowing through it incremented by 1.

When the capacitive transformer is arranged in a three-phase portion of the circuit, the frequency-raising stage may have a delta or star configuration.

In the case of a delta configuration, each side of the delta may define two branches of the frequency-raising stage, each of these branches comprising two controllable electronic switches arranged in series, so that each of these branches produces a switching cell, and these two branches on one and the same side of the delta have a common terminal forming an output of the frequency-raising stage and an input of the capacitive transformer.

In the case of a star configuration, each arm of the star may define two branches of the frequency-raising stage, each of these branches comprising two controllable electronic switches arranged in series, so as to produce a switching cell, and these two branches on one and the same arm of the star have a common terminal forming an output of the frequency-raising stage and an input of the capacitive transformer.

The two controllable electronic switches on one and the same branch of the frequency-raising stage may be two oppositely doped or identically doped field-effect transistors, or two oppositely doped or identically doped bipolar junction transistors. In the case of field-effect transistors, one of these transistors may be an n-channel MOSFET while the other transistor on this branch is a p-channel MOSFET. Still in the case of field-effect transistors, the two transistors forming a switching cell may be connected in a common-source configuration or in a common-drain configuration. In the case of bipolar junction transistors, one of these transistors is, for example, an NPN transistor while the other transistor is a PNP transistor. Still in the case of bipolar junction transistors, the two bipolar junction transistors forming a switching cell may be connected in a common-emitter configuration or in a common-collector configuration.

When two transistors having opposite doping to each other are found within each branch of the frequency-raising stage, the transistor on the first branch and the transistor on the second branch both having identical doping may have the same position in their respective arm relative to the common terminal. Each of these two identically doped transistors is, for example, within its respective arm, the transistor connected directly adjacent to this common terminal. As a variant, these two identically doped transistors may have, in their respective arm, different positions relative to this common terminal. One of these transistors is, for example, the transistor on the first arm which is directly adjacent to the common terminal while the other of these transistors is the transistor on the second arm which is not directly adjacent to this common terminal, the transistor on the second arm which is directly adjacent to the common terminal having a different doping.

The invention is not limited to choosing bipolar transistors or field-effect transistors to produce switching cells that are bidirectional in terms of current and in terms of voltage. As a variant, the frequency-raising stage may use IGBTs.

When the invention uses MOSFETs, the latter may be produced from gallium nitride (GaN) or from silicon carbide (SiC) or from silicon.

According to a first example of implementation of the invention, an inductor may be connected in series with a capacitor of the capacitive transformer, in particular between the terminal forming an input of the capacitive transformer and this capacitor of this capacitive transformer. This inductor may form a resonant inductor and its association with a capacitor of the capacitive transformer may form a resonant LC cell.

According to a second example of implementation of the invention, the first branch of the frequency-raising stage comprises a first inductor and the second branch of the frequency-raising stage comprises a second inductor, the first and the second inductor being magnetically coupled. Such magnetically coupled inductors belonging respectively to each branch may make it possible to reduce EMC interference.

In all the above, the circuit may comprise a rectifier connected between the capacitive transformer and the first output. This rectifier may be a full-wave rectifier or another type of rectifier such as a voltage doubler.

In all the above, each branch of the frequency-raising stage may be such that all the current flowing through one of the controllable electronic switches on this branch also flows through the other controllable electronic switch on this branch. In other words, no node for the current is then arranged between these two controllable electronic switches.

In all the above, the circuit may also comprise a current-regulating stage arranged between the rectifier and the first output. This regulating stage implements, for example, the function of power-factor correction, thereby making it possible to decrease the reactive current sent to the electrical network. This regulating stage may be formed by a series chopper or a parallel chopper or even a buck/boost converter depending on the nominal voltage value of the electrical network and the nominal voltage value of the unit for storing electrical energy forming the first DC voltage source.

In all the above, the frequency-raising stage may be configured to bring a frequency of 50 Hz to a frequency value between 200 Hz and 100 MHz.

The invention is not limited to a circuit making it possible to charge a single DC voltage source from the AC network. In combination with all the above, the circuit may also make it possible to charge a second DC voltage source, the circuit comprising: a second output connected to the second DC voltage source, and another capacitive transformer formed using a plurality of capacitors and arranged so as to electrically insulate the input from the second output of the circuit.

This other capacitive transformer may be functionally connected in parallel with the one previously described. No capacitor belonging to this other capacitive transformer also belongs, for example, to the capacitive transformer previously described for electrically insulating the input from the first output. When a plurality of DC voltage sources are charged by the circuit, there may be only one frequency-raising stage, which is therefore common to these various voltage sources.

When the AC network makes it possible to charge two separate DC voltage sources, these two DC voltage sources may or may not have the same voltage value, for example 48 V or a value greater than 300 V. As a variant, these two DC voltage sources may have different voltage values.

In all the above, the various switches of the circuit may be chosen so that the circuit is reversible in terms of power flow.

Another subject of the invention, according to another of its aspects, is an assembly comprising:
  the circuit as defined above, and
  the DC voltage source connected to the first output of the circuit, this DC voltage source in particular having a nominal value of 48 V.

Figure 2:
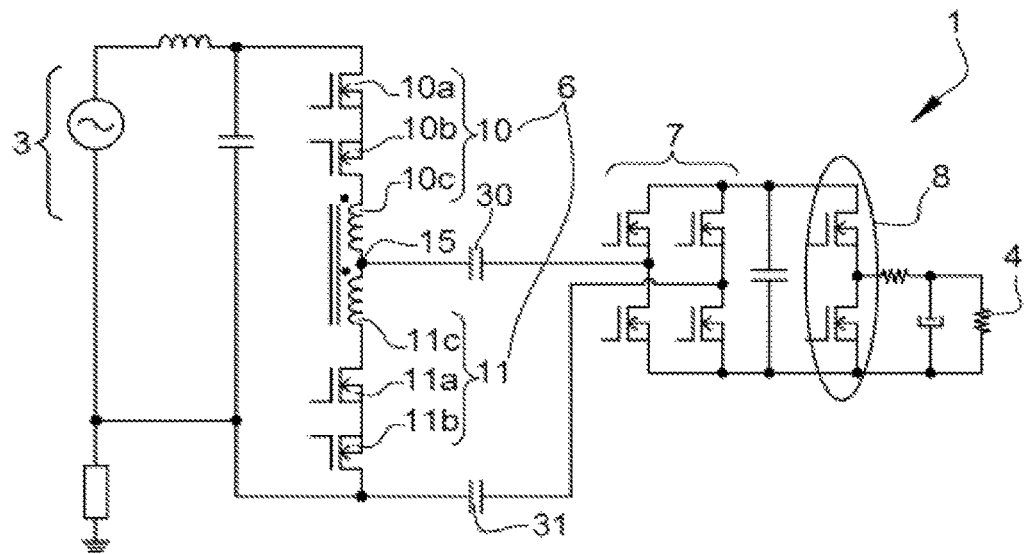
Figure 3:
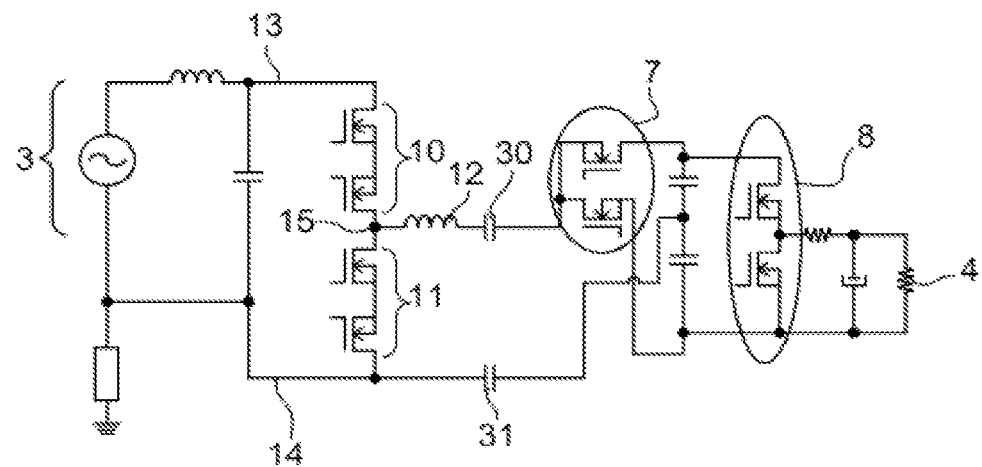
Figure 4:
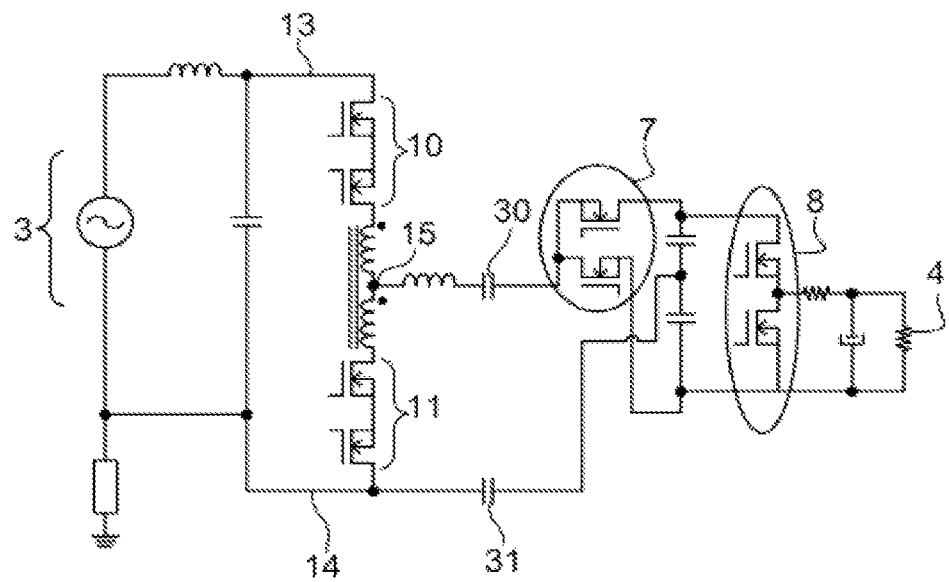
Figure 5:
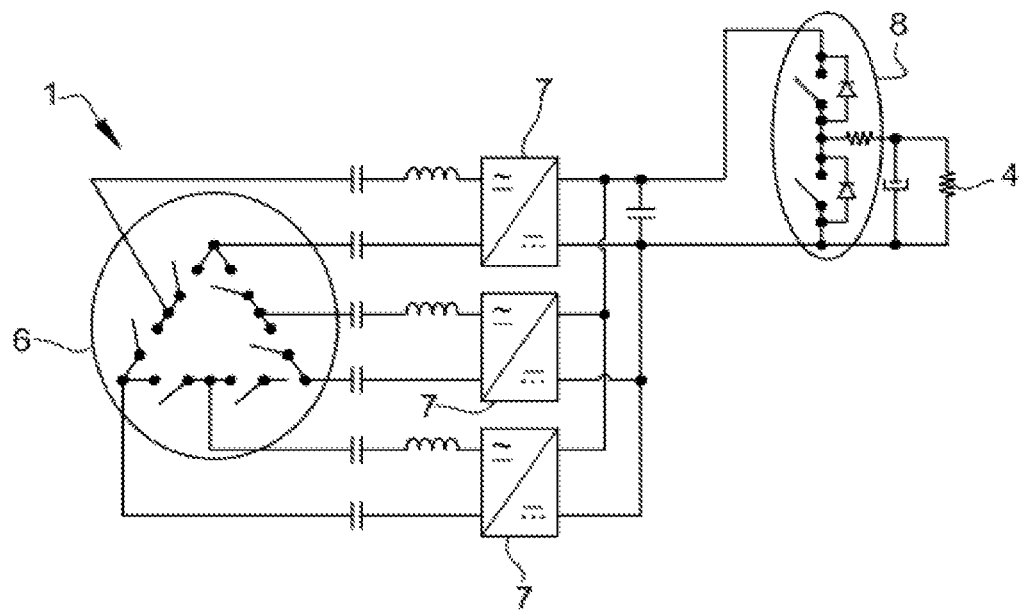
Figure 6:
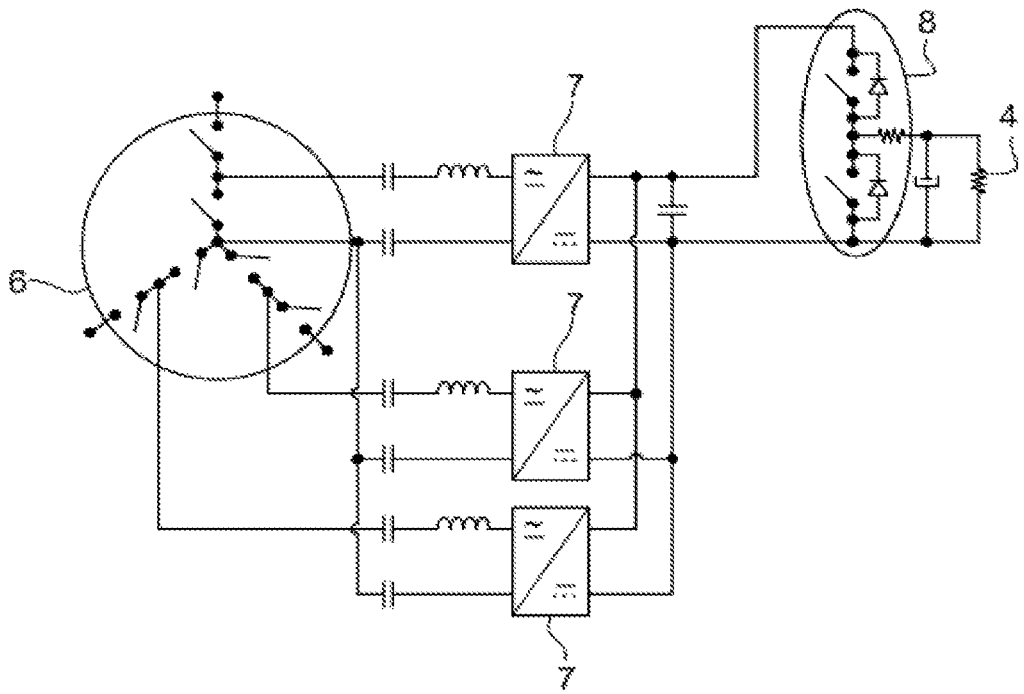

The invention will possibly be better understood on reading the following description of non-limiting examples of implementation thereof and on examining the appended drawing, in which:

FIG. 1 shows a circuit according to a first example of implementation of the invention, FIG. 2 shows a circuit according to a second example of implementation of the invention, FIG. 3 shows a circuit according to a variant of the first example of implementation of the invention, FIG. 4 shows a circuit according to a variant of the second example of implementation of the invention, and FIGS. 5 and 6 show variants of the circuit of FIG. 1 when this circuit is at least in part three-phase, FIG. 5 showing a frequency-raising stage with a delta configuration and FIG. 6 showing a frequency-raising stage with a star configuration.

FIG. 1 shows an electrical circuit 1 according to a first example of implementation of the invention. This circuit 1 here makes it possible to charge a first DC voltage source from an AC network. The AC network is, for example, an industrial electrical network managed by an operator and which delivers a single-phase voltage in the case of FIG. 1. However, the invention is not limited to a single-phase network, as will be seen below. The frequency of the voltage of the network is, for example, equal to 50 Hz or 60 Hz. In the example under consideration, the electrical network is connected to an input 3 of the electrical circuit 1 via a connector (not shown).

According to this first example, the circuit 1 comprises a frequency-raising stage 6, which will be described below, and one output terminal of which forms an input terminal for a capacitive transformer which here is formed by two capacitors 30 and 31, the capacitor 30 being arranged on the phase and the capacitor 31 being arranged on the neutral of the electrical signal conveyed by the circuit. It may be observed that an inductor 12 is connected in series with the capacitor 30 which is arranged on the phase.

With respect to the positive current flowing from the input 3 of the electrical circuit 1, downstream of the capacitive transformer a rectifier 7 which here is a Graetz bridge performing full-wave rectification. This rectifier 7 comprises controllable electronic switches which here are MOSFETs.

It may also be observed in FIG. 1 that a regulating stage 8 is present, connected downstream of the rectifier 7 with respect to the positive current flowing from the input 3 of the electrical circuit 1.

In the example of FIG. 1, the regulating stage employs a series chopper which lowers the voltage rectified by the rectifier 7 to a voltage delivered to the first DC voltage source via a first output 4 of the circuit 1. Still in the described example, the electronic switches of this regulating stage 8 are controlled so that this regulating stage 8 performs a function of power-factor correction (PFC).

The DC voltage source is here a unit for storing energy with a nominal value of 48 V and it makes it possible to supply electric power to an electric propulsion motor of a hybrid or electric vehicle.

The frequency-raising stage 6 which makes it possible for the capacitive transformer to see an electrical signal the frequency of which is greater than that of the network, this frequency being, for example, between 200 Hz and 100 MHz, will now be described in more detail. This frequency-raising stage consists, in the example of FIG. 1, of:

a first branch 10 comprising two controllable electronic switches 10a and 10b arranged in series, to as to produce a first switching cell that is bidirectional in terms of current and in terms of voltage, and a second branch 11 comprising two controllable electronic switches 11a and 11b arranged in series, so as to produce a second switching cell that is bidirectional in terms of current and in terms of voltage.

It may be observed that this frequency-raising stage 6 has, in the example under consideration, two input terminals 13 and 14 in parallel to which a decoupling capacitor is connected. Each of these terminals 13 and 14 is respectively connected, directly or indirectly, to a terminal of the input 3 of the circuit.

This frequency-raising stage 5 comprises, in the example of FIG. 1, two output terminals. One of these terminals 15 is common to the two branches 10 and 11 and it is connected to the capacitor 30 of the capacitive transformer which is arranged on the phase of the signal while the other output terminal is connected to the capacitor 31 of the capacitive transformer which is arranged on the neutral of the electrical signal.

In the example under consideration, each branch 10 and 11 contains no other components than the two switches mentioned above. In addition, in this first example of implementation, any electric current flowing through one of the switches on one of the branches also flows through the other switch on this branch, i.e. there is no current node between these two switches.

In the example under consideration, each of these switches is a MOSFET. More specifically, the transistor 10a is an n-channel MOSFET and the transistor 10b is an n-channel MOSFET, these two transistors being connected in a common-source configuration. The transistor 11a is an re-channel MOSFET and the transistor 11b is an n-channel MOSFET, these two transistors also being connected in a common-source configuration.

Each MOSFET is, for example, produced from gallium nitride (GaN) or from silicon carbide (SiC) or from silicon.

During each positive half-cycle of the voltage applied to the input 3, the transistors 10a and 11a, for example, are controlled so that they have a duty cycle of 50% while the transistors 10b and 11b are kept in the on state and, during each negative half-cycle of the voltage applied to the input 3, the transistors 10b and 11b are controlled so that they have a duty cycle of 50% while the transistors 10a and 11a are kept in the on state.

In the case where synchronous rectification is performed in the rectifier 7, a voltage the value of which is equal to half the modulus of the AC voltage applied to the input 3 may be obtained as output from this rectifier 7.

A circuit 1 according to a second example of implementation will now be described with reference to FIG. 2. According to this second example of implementation, the inductor 12 of FIG. 1 which is in series with the capacitor 30 of the capacitive transformer is replaced by a first inductor 10c arranged in the first branch 10 and by a second inductor 11c arranged in the second branch 11. These inductors 10c and 11c are here magnetically coupled and they are both directly adjacent to the common output terminal 15 of the frequency-raising stage 6. Thus, in the second example of implementation, the first branch 10 consists of the two series-connected switches 10a and 10b and of the first inductor 10c in series with these switches. The second branch 11 consists of the two switches 11a and 11b and of the second inductor 11c. Similarly to what was described with reference to the first example of implementation, it may also be observed in this second example of implementation that any electric current flowing through one of the switches on one of the branches also flows through the other switch on this branch, i.e. there is no current node between these two switches.

FIGS. 3 and 4 show variants of the first example of implementation and of the second example of implementation, respectively.

The circuit of FIG. 3 differs from that of FIG. 1 in that the rectifier 7 is no longer a full-wave rectifier but rather a voltage doubler.

Similarly, the circuit of FIG. 4 differs from that of FIG. 2 in that the rectifier 7 is a voltage doubler, and no longer a full-wave rectifier.

The invention is not limited to the examples which have just been described.

In variants which are not described, the AC network is polyphase, in particular three-phase.

In other variants, the capacitive transformer may be arranged in a polyphase, for example three-phase, portion of the circuit 1, including when the AC network is single-phase. Thus, FIG. 5 shows the case where the frequency-raising stage 6 has a delta configuration. Each side of the delta here defines two branches of the frequency-raising stage 6, each of these branches comprising two controllable electronic switches arranged in series (not shown individually in this figure), so that each branch produces a switching cell. It may be observed that two branches on one and the same side of the delta have a common terminal forming an output of the frequency-raising stage and an input of the capacitive transformer.

FIG. 6 shows the case where the frequency-raising stage 6 has a star configuration. Each arm of the star here defines two branches of the frequency-raising stage 6, each of these branches comprising two controllable electronic switches arranged in series, so as to produce a switching cell. These two branches on one and the same arm of the star have a common terminal forming an output of the frequency-raising stage and an input of the capacitive transformer.

In the example of FIGS. 5 and 6, magnetically coupled inductors may be used instead of inductors respectively in series with one capacitor of the capacitive transformer, similarly to what was described with reference to FIG. 2.

In variants which are not described, a second DC voltage source is charged from the AC network. In this case, the frequency-raising stage 6 may be common to the first DC voltage source and to the second DC voltage source.

The invention may also be used in other applications. A capacitive transformer such as described above may, for example, be used to insulate a communication signal between two pieces of equipment connected by a network, for example a CAN, SPI RS-485, RS-232 data network, etc.

The invention claimed is:

1. An electrical A circuit for charging a DC voltage source from an AC voltage network, the circuit comprising:
    an input able to receive an AC voltage from the AC voltage network,
    a first output able to be connected to the DC voltage source,
    an insulating stage formed using a plurality of capacitors, which is arranged so as to electrically insulate the input from the first output of the circuit,
    and
    a frequency-raising stage arranged between the input of the circuit and the insulating stage so that the plurality of capacitors of the insulating stage are in a circuit portion that has flowing through it an AC current at a frequency that is greater than that of the AC voltage network, the frequency-raising stage being different from an association in series of a rectifier and of an inverter,
    the frequency-raising stage comprising;
    a first branch comprising two controllable electronic switches arranged in series, so as to produce a first switching cell that is bidirectional in terms of current and in terms of voltage, and
    a second branch comprising two controllable electronic switches arranged in series, so as to produce a second switching cell that is bidirectional in terms of current and in terms of voltage,
    the first and second branches of the frequency-raising stage having a common terminal forming an output of the frequency-raising stage and an input of the insulating stage.

2. The circuit as claimed in claim 1, the insulating stage being arranged in a single-phase portion of the circuit, or in a polyphase, in particular three-phase, portion of the circuit.

3. The circuit as claimed in claim 1, an inductor being connected in series with a capacitor of the insulating stage.

4. The circuit as claimed in claim 1, the first branch of the frequency-raising stage further comprising a first inductor and the second branch of the frequency-raising stage further comprising a second inductor, the first inductor and the second inductor being magnetically coupled.

5. The circuit as claimed in claim 1, further comprising a rectifier connected between the insulating stage and the first output.

6. The circuit as claimed in claim 5, the rectifier being a full-wave rectifier or a voltage doubler.

7. The circuit as claimed in claim 1, each branch of the frequency-raising stage being such that all of a current flowing through one of the two controllable electronic switches on a branch also flows through the other controllable electronic switch on the branch.

8. The circuit as claimed in claim 5, further comprising a current-regulating stage arranged between the rectifier and the first output.

9. The circuit as claimed in claim 1, the frequency-raising stage being configured to bring a frequency of 50 Hz to a frequency value between 200 Hz and 100 MHz.

10. An assembly comprising:
    the circuit as claimed in claim 1,
    the DC voltage source connected to the first output of the circuit having a nominal value of 48 V.

11. The assembly as claimed in claim 10, further comprising a circuit board on which the plurality of capacitors of the insulating stage are mounted.

12. The circuit as claimed in claim 2, an inductor being connected in series with a capacitor of the insulating stage.

13. The circuit as claimed in claim 2, the first branch of the frequency-raising stage further comprising a first inductor and the second branch of the frequency-raising stage further comprising a second inductor, the first inductor and the second inductor being magnetically coupled.

14. The circuit as claimed in claim 2, further comprising a rectifier connected between the insulating stage and the first output.

15. The circuit as claimed in claim 2, each branch of the frequency-raising stage being such that all of a current flowing through one of the two controllable electronic switches on a branch also flows through the other controllable electronic switch on the branch.

16. The circuit as claimed in claim 14, further comprising a current-regulating stage arranged between the rectifier and the first output.

17. The circuit as claimed in claim 2, the frequency-raising stage being configured to bring a frequency of 50 Hz to a frequency value between 200 Hz and 100 MHz.

18. An assembly comprising:
    the circuit as claimed in claim 2,
    the DC voltage source connected to the first output of the circuit having a nominal value of 48 V.

19. The circuit as claimed in claim 3, further comprising a rectifier connected between the insulating stage and the first output.

20. The circuit as claimed in claim 3, each branch of the frequency-raising stage being such that all of a current flowing through one of the two controllable electronic switches on a branch also flows through the other controllable electronic switch on the branch.

21. The circuit as claimed in claim 1, wherein the first branch comprises the two controllable electronic switches arranged in series in a common-source configuration or a common-drain configuration and the second branch comprises the two controllable electronic switches arranged in series in a common-source configuration or a common-drain configuration.

* * * * *